April 12, 1927.  1,624,831
D. GEDDES
GRAIN WASHING AND DRYING MACHINE
Filed Nov. 24, 1925  2 Sheets-Sheet 1
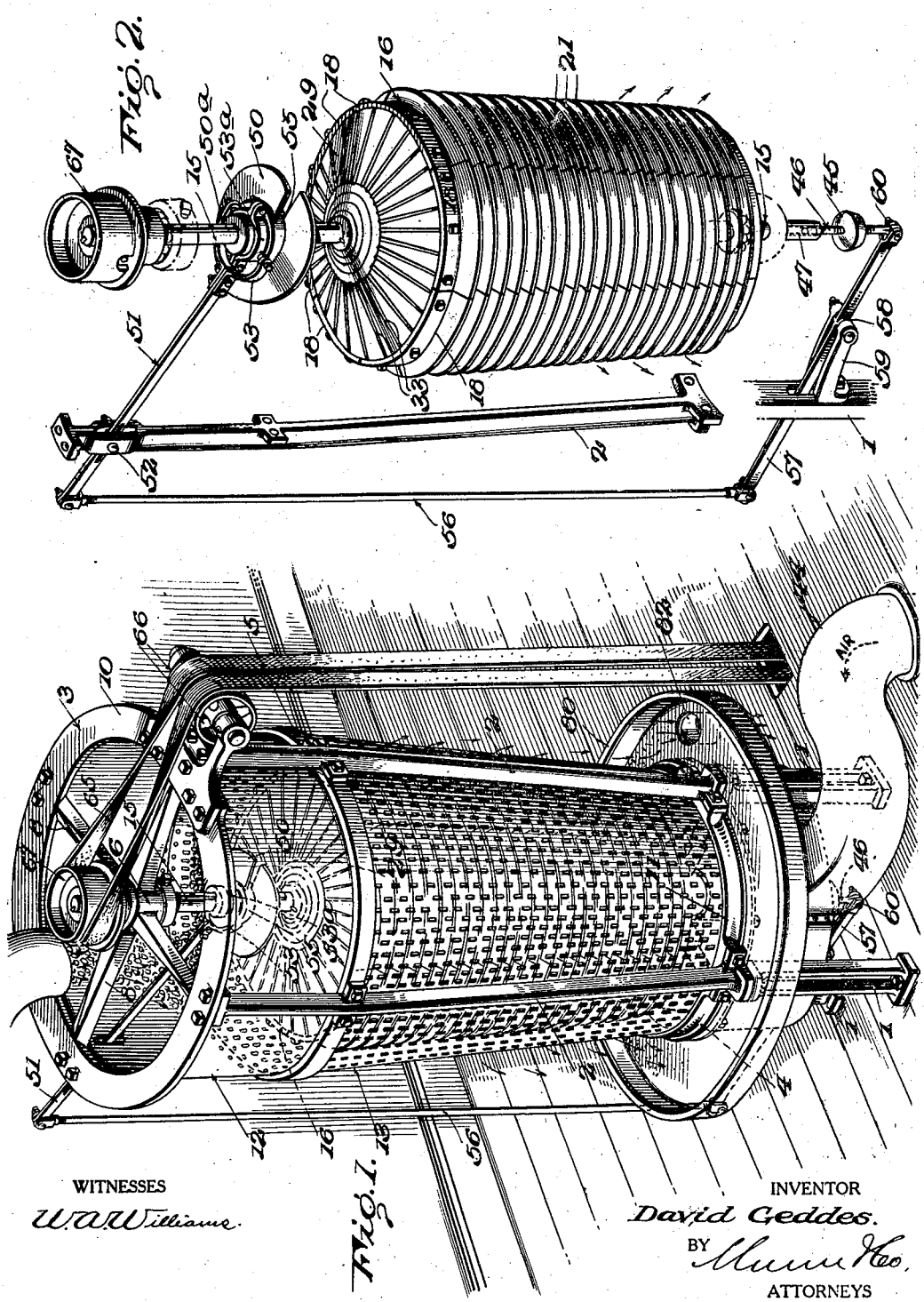
WITNESSES
W.A.Williams
INVENTOR
David Geddes.
BY
ATTORNEYS April 12, 1927. 1,624,831
D. GEDDES
GRAIN WASHING AND DRYING MACHINE
Filed Nov. 24, 1925 2 Sheets-Sheet 2
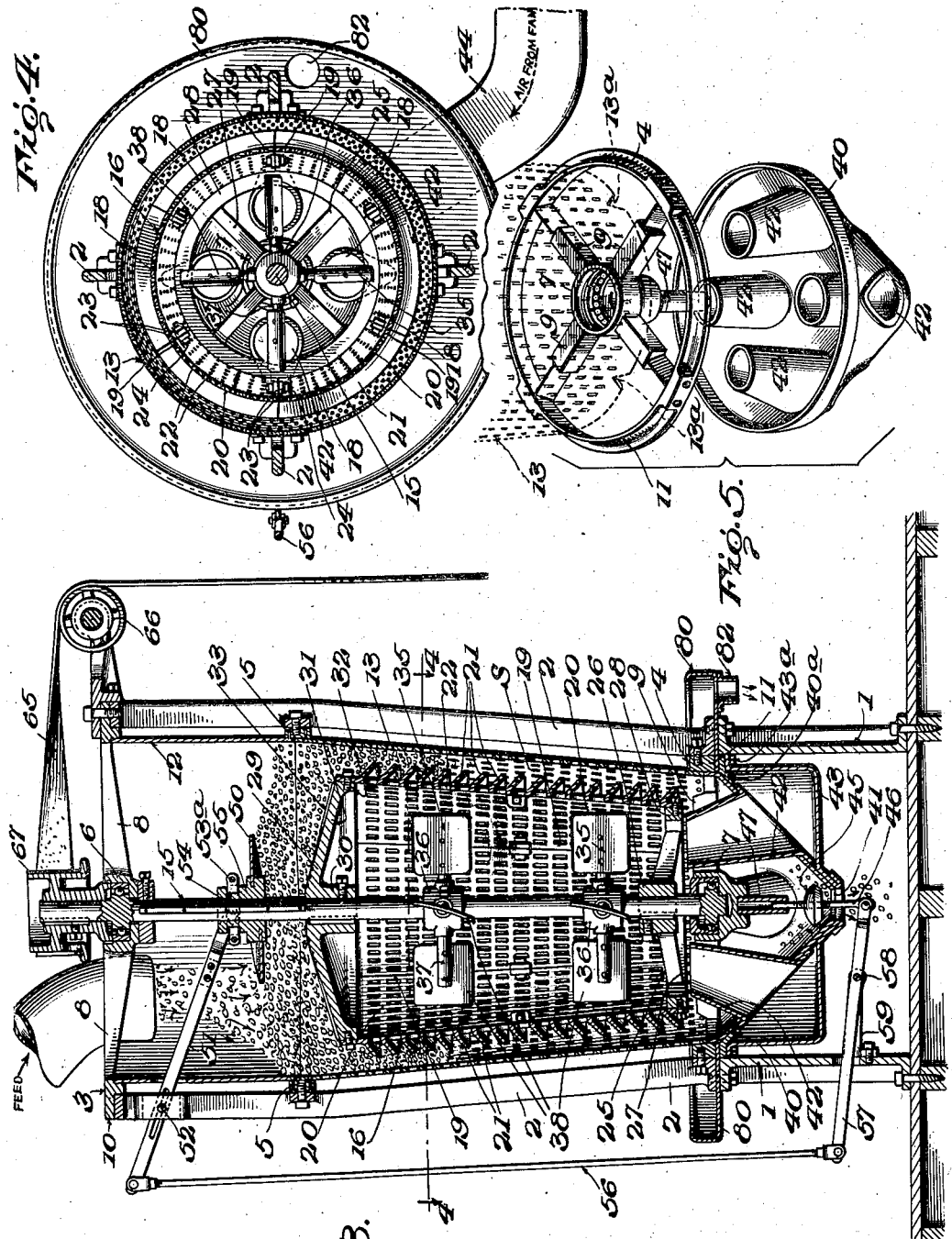

Patented Apr. 12, 1927.

1,624,831

UNITED STATES PATENT OFFICE.

DAVID GEDDES, OF GUADALAJARA, JALISCO, MEXICO.

GRAIN WASHING AND DRYING MACHINE.

Application filed November 24, 1925. Serial No. 71,229.

This invention relates to an improvement in grain washing and drying machines.

One of the principal objects of the invention is to provide a machine of this character wherein the grain is thoroughly washed, scoured, polished, aerated, tempered, cleaned and dried so as to be properly conditioned and prepared for milling purposes without breaking the grain.

Another important object is to provide a machine of this character wherein the grain may be treated to effect the results stated for a period of time dependent upon its condition and properties, and wherein the amount of wheat fed per unit of time automatically regulates and controls the time of treatment.

Another important object is to provide a machine having these advantages and capacities and wherein the same amount of power is required and expended irrespective of the character or degree of the treatment to which the grain is subjected, the capacity of the machine being the only varying factor.

Another object is to provide a machine of this character in which all smut, wild onion, dirt and the like are carried out of the grain during, and by virtue of the operation, effecting the tempering and conditioning of the grain.

A further object resides in the provision of a machine having these advantages and capacities and which is of simple and durable construction, reliable and efficient in operation, economical in the consumption of power, and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a perspective view showing a machine embodying the invention,

Figure 2 is a fragmentary detail view in perspective showing the rotating drum and the automatic operating mechanism for the discharge valve, Figure 3 is a view thereof in diametrical vertical section, parts being shown in elevation for the sake of illustration, Figure 4 is a view in horizontal section on the line 4—4 of Figure 3, and Figure 5 is a group view in perspective showing the collector, lower supporting spider for the outer drum and also a portion of the outer drum.

Referring to the drawings wherein for the sake of illustration is shown one embodiment of the invention, it will be seen that the machine comprises a suitable supporting frame made up of a plurality of legs 1 secured to the base or foundation and to the upper ends of which the lower ends of posts or uprights 2 are secured. The framework is completed by means of an upper spider 3, a lower spider 4 and an intermediate ring 5 all of which are securely fastened to the uprights. The spiders 3 and 4 have hubs 6 and 7, radial arms 8 and 9 and outer rings 10 and 11, respectively.

The rings 10, 11 and 5 are suitably secured to the uprights 2, the outer peripheries of these rings being engaged with the uprights. A receiving drum 12 is fitted in and suitably secured to the rings 10 and 5, and a slotted or foraminous drum 13 of frusto-conical form is fitted in and suitably secured to the rings 5 and 11. The lower end of the drum 13 is suitably notched, as at 13ª (see Fig. 5) to accommodate the arms 9 of the spider 4.

A shaft 15 is rotatably mounted in bearings provided therefor in the hubs 6 and 7 of the spiders and on this shaft and within the foraminous drum 13, a rotating drum, designated generally at 16, is mounted and secured. The drum 16 is somewhat smaller than, though similar in form to, the drum 13 so that between the drums 13 and 16 a grain treating space S is defined.

The drum 16 is made up of a plurality of similar sections 18, each section 18 having imperforate marginal framing bars 19 and a slotted body plate 20. The plate 20 and bars 19 are preferably integral and on the outside of the body plate 20 a plurality of parallel and downwardly inclined vanes 21 are integrally formed, the vanes 21 overhanging the slots. As shown, one such vane 21 is provided for each circumferential row of slots 22 and each vane extends from just above its slots 22 outwardly and downwardly to a point alined with or just below the bottom walls of its slots 22. The sections and the vanes thereof are curved so that when the sections are assembled they and their vanes are of circular cross section. For the purpose of securing the sections in assembly apertured lugs 23 are formed in the sections and in the assembly lugs 23 of adjacent sections 18 are alined and co-act with bolts and nuts 24.

The lower end of the drum is mounted on and driven from the shaft 15 by means of a spider designated generally at 25 and having a hub 26 fixed to the shaft 15, radially extending arms 27 integral with the hub and a peripheral ring 28 carried by the arms 27 and fitting with, and bolted to the lower end of the drum 16.

The upper end of the drum 16 is mounted on and driven from as well as closed by an end plate or closure 29 having a hub 30 fixed to the shaft 15 and an outwardly and downwardly extending body portion 31 integral with the hub and terminating at its periphery in a depending annular flange 32 fitting in the upper end of and bolted to the drum 16. The upper outwardly and downwardly sloping face of the body portion of the end plate or closure 29 may have a series of radially extending ribs 33.

Means is provided for drawing air axially upwardly through the open lower end of the drum 16 and forcing the same radially outward thereof, and such means preferably comprises a plurality of fans designated generally at 35 and mounted on and driven by the shaft 15 within the drum 16. Each fan has a hub 36 from which radial arms 37 extend, fan blades 38 being carried by the arms 37. The fan blades are shaped and formed to draw air upwardly through the open lower end of the drum 16 and expel the same radially outward through the slots of the drum across the space S and out through the slots of the drum 13.

A collector 40 is provided at the lower end of the drum 13 for receiving the grain as the same falls down from the space S. The collector is shaped so as to present a sloping wall down to a central discharge opening 41. Air inlet tubes 42 lead up through the collector 40 to convey the air into the interior of the drum 16 without permitting the same to interfere with the descending grain in the collector. A casing 43 entirely encloses the collector except for that portion of the collector in which the discharge opening 41 is formed, such portion of the collector projecting slightly downwardly below the casing. The casing 43 by virtue of its assembly with the collector is entirely closed except for an air inlet pipe 44. As shown in Figure 3, the air inlet tubes 42 are in direct and open communication with the interior of the casing 43 so that the air may be drawn directly into the drum 16. The casing 43 and collector 40 are supported in position by means of bolts 43ª extending through bolt holes provided therefor in these parts and in a collector holder ring 40ª and threaded into the ring 11 of spider 4.

A discharge valve 45 regulates the discharge of grain from the opening 41. The valve 45 is fixed on a stem 46 slidably fitted in a guide 47 whereby the valve is constrained to partake of proper movements. Automatic means is provided for opening and closing the valve 45 and comprises a screw 50 splined on the shaft 15, as at 50ª, that is, the screw is constrained to partake of the rotary movement of the shaft although freely movable longitudinally thereof. The screw 50 operates in the receiving drum 12 and, due to the rotation imparted thereto by the shaft 15 and to its action on the grain in the drum 12, will rise to the top or level of the grain in the drum 12. Motion transmission means is provided between the screw 50 and the valve 45 and comprises an upper lever 51 slidably fulcrumed at 52 on one of the uprights 2 and having a yoke 53 on one end equipped with a gimbal ring 53ª engaging an annular groove 54 formed in the hub 55 of the screw 50. The other end of the lever 51 is pivotally fastened to one end of a connecting rod 56, the opposite end of the connecting rod 56 being pivoted to a lower lever 57 fulcrumed, as at 58, on a bracket 59 and having a pin and slot connection 60 with the valve stem 46.

Suitable power means is provided for driving the shaft 15. Preferably the power is applied to the upper end of the shaft 15 by means of a belt 65 trained over guide pulleys 66 and a driven pulley 67 fixed to the upper end of the shaft 15.

An annular drain or drip pan 80 is provided for receiving the water separated from the grain and trickling down on the outside of the drum 13. The pan 80 is provided with a discharge pipe 82 leading to any suitable point of discharge.

In operation the wheat or grain and water is spouted or otherwise suitably conveyed into the receiving drum 12 from whence it falls by gravitation through the grain treating space S between the drums 13 and 16 into the collector 40. In the collector 40 the grain slides down onto the discharge valve 45 which at this time closes the discharge opening 41. The grain gradually fills up the collector and the grain treating space S (a wall of grain being built up in the space S) and its level gradually rises in the drum 12 until it reaches the rotating screw 50. The screw 50 is rotated at a rapid rate, usually 500 R. P. M., and it levels off the grain and as the level of the grain rises in the drum 12, the screw 50 is forced upwardly on the shaft 15 as a result of its rotation and the co-action of its blades with the grain. The upward movement of the screw 50 is transmitted to the valve 45 by means of the motion transmission means including the lever 51, connecting rod 56 and lever 57 in such manner as to open the valve 45 when the screw 50 moves upwardly along the shaft 15 as it does when the level of the grain in the drum 12 rises in the manner stated. The opening of the discharge valve 45 allows the grain to flow until a balance is reached between the amount of grain going into the drum 12 and the amount of grain flowing out through the discharge opening 41. The discharge of the grain is always steady and any change in the rate of discharge is slow and gradual by reason of the fact that the ratio of movement between the screw 50 and valve 45 is ten to one and because of the capacity of the drum 12 is so much greater than the area of the outlet 41. The steady discharge and the slow and gradual change of the rate of discharge is an important feature since it maintains at all times a solid wall of grain between the drums 13 and 16, thereby preventing the formation of open spaces in the grain treating space S through which the air current may escape without serving any purpose and also preventing uneven treatment of the grain due to the difference in travelling velocity of the wet grain and dry grain or to the adherence of wet grain to the drum 16. All the grain is subjected to the same washing, polishing and aerating action.

As the drum 16 is rotated rapidly the grain and water which falls on to the vanes 21 is thrown outwardly off of the vanes 21 and against the inner periphery of the drum 13 thereby forming a thin wall of grain between the drums which is less compact around the outer edge of each vane 21 than elsewhere since the grain falls by gravity from the point where it is thrown off of one vane down onto the next vane. During this action the outside grains displace the inside grains on each vane and this allows the air current flowing out through the slots 22 to play over all of the grains so that the water as well as dirt and other foreign matter is separated from the grain and carried out through the perforations of the drum 13 by the combined action of the air current and centrifugal force. The grain falling by gravity from one vane to the other and having first an inward and then an outward movement on each vane is subjected to the action of the air current and centrifugal force as well as to the scouring action of the flat surfaces of the vanes for the proper or desirable length of time. And along with the advantageous action there can be no broken wheat as there are no beaters or sharp projections to ruffle the outside coating of the grain. At this point it is to be noted that while the vanes 21 are shown as having flat or smooth top surfaces, such top surfaces may be ribbed or roughened without danger of injuring the grain. It will now be understood that during its passage through the machine the grain is uniformly washed, scoured, polished, tempered, cleaned and dried.

There are many kinds of wheat, hard and soft, clean and dirty and wheats that will absorb more moisture than others but the present invention furnishes a machine that is controlled by time plus capacity for washing, drying and cleaning wheat, that the operator may have full control over the process, regardless of the quality, with little waste, little expense for repairs and with little expenditure of power for the amount of wheat treated. As illustrating this feature assume that the screw 50 and discharge valve 45 have reached their working or balanced position, that the machine is holding ten bushels of wheat and is taking in and discharging at the rate of 30 bushels per hour. Under such conditions each bushel of wheat discharged is taking two minutes of time or twenty minutes for the ten bushels, so the result is that the last of the ten bushels to enter the machine would take twenty minutes before it was discharged through discharge opening 41 and all this time it would be under the cleaning action of the machine. So on this basis, if the grain does not require so much cleaning, the capacity is raised to 60 bushels per hour or one bushel per minute, the cleaning time would be ten minutes; if 120 bushels per hour, five minutes and so on. As the amount of wheat contained in the machine, regardless of the capacity being cleaned, is practically always at the same level in the receiving drum 12, the consumption of power for driving the machine is practically always the same, the amount of power consumed in a unit of time is governed by the amount of cleaning the wheat may require. The capacity is regulated by the cleaning required on the wheat and this is automatically controlled by the amount of wheat per unit of time, being fed into the receiving drum 12. As the wall of the drum 13 is tapered the water and dirt forced through the perforation in its walls cannot return to the inside on account of the continual air pressure, and therefore drops into the pan 80 where it is carried off through the drain pipe 82. The air supplied through the air inlet pipe 44 can be brought from any suitable place, if much water is used on the wheat, cold air can be used, if more thorough drying is required and little water used or if a second machine is used, hot air can be used.

An important feature of this machine is, that the washing, cleaning, etc., is automatically controlled to clean grain in a unit of time with practically the same amount of power, whether 30 bushels per hour is going through or 60 bushels without breaking the grain. Or to summarize what has been stated above, if the wheat is very dirty it can have a capacity of 30 bushels per hour and if very clean 60 bushels per hour, and the 30 bushels per hour would naturally take more minutes per bushel than a feed of 60 bushels per hour. In this respect the power used would be more per bushel of grain on account of time. But the actual power required to rotate drum 16 and other rotating parts would always be the same, as these parts are moving the same weight or body of grain at all times, one grain displacing the other.

I claim:—

1. In a machine of the character described, an outer stationary foraminous drum, an inner rotating drum having perforations and having rigid annular vanes fixed thereto and overlying the perforations and projecting into a grain treating space defined by said drums, means for rotating the inner drum, and means for causing a current of air to pass into the inner drum and laterally of the drums and across the grain treating space.

2. In a machine of the character described, an outer stationary foraminous drum, an inner rotating drum having a closure at its top and also having perforations in its periphery, rigid annular vanes extending around the periphery of the rotating drum and overlying the perforations and projecting into a grain treating space defined by said drums, means for rotating the inner drum, means for causing a current of air to traverse the grain treating space, a receiving drum surmounting the stationary drum, a collector for receiving the grain from the grain treating space and having a discharge opening, a discharge valve regulating the flow of grain through the opening, and means controlled by the level of the grain in the receiving drum for governing the opening and closing of the discharge valve.

3. In a machine of the character described, an outer stationary foraminous drum, an inner rotating drum having perforations and having rigid annular vanes overlying the perforations and projecting into a grain treating space defined by said drum, means for rotating the inner drum, means for causing a current of air to traverse the grain treating space, a receiving drum surmounting the stationary drum, a collector for receiving the grain from the grain treating space and having a single discharge opening, a discharge valve cooperable with the discharge opening to completely close the same and shut off the flow of grain and also cooperable therewith to regulate the discharge therethrough, and means controlled by the level of the grain in the receiving drum for governing the opening and closing of the discharge valve, and comprising a screw rotating in the grain in the receiving drum and motion transmission means between the screw and the valve.

4. In a machine of the character described, an outer stationary foraminous drum, an inner rotating drum having perforations and having vanes overlying the perforations and projecting into a grain treating space defined by said drums, means for rotating the inner drum, means for causing a current of air to traverse the grain treating space, a collector for receiving the grain from the grain treating space, a casing for the collector having air inlet means, and air inlet tubes extending through the collector for conveying air from the casing into the inner drum.

5. In a machine of the character described, an outer stationary foraminous drum, an inner rotating drum having perforations and having vanes overlying the perforations and projecting into a grain treating space defined by said drums, means for rotating the inner drum, means for causing a current of air to traverse the grain treating space, and a drip pan fixed to and encircling the outer drum for collecting the moisture.

6. In a machine of the character described, a frame, a stationary perforated drum mounted on the frame, a receiver surmounting the stationary drum, a shaft extending axially of the receiver and drum, a rotatable perforated drum mounted on the shaft within the stationary drum, said rotatable drum having its lower end open and having an outwardly and downwardly sloping closure at its upper end, said drums defining a grain treating space to which the end closure slopes, means for rotating the inner drum, and means for causing a current of air to traverse the drums and the grain treating space.

7. In a machine of the character described, a frame, a stationary perforated drum mounted on the frame, a receiver surmounting the stationary drum, a shaft extending axially of the receiver and drum, a rotatable perforated drum mounted on the shaft within the stationary drum, said rotatable drum having its lower end open and having an outwardly and downwardly sloping closure at its upper end, said end closure having radial ribs, said drums defining a grain treating space to which the end closure slopes, means for rotating the inner drum, and means for causing a current of air to traverse the drums and the grain treating space.

8. In a machine of the character described, a frame, a stationary perforated drum mounted on the frame, a receiver surmounting the stationary drum, a shaft extending axially of the receiver and drum, a rotatable perforated drum mounted on the shaft within the stationary drum, said rotatable drum having its lower end open and having an outwardly and downwardly sloping closure at its upper end, downwardly and outwardly inclined circumferential vanes fixed on the inner drum and overlying the openings thereof, said drums defining a grain treating space to which the end closure slopes, means for rotating the inner drum, and means for causing a current of air to traverse the drums and the grain treating space.

9. In a machine of the character described, means for treating and conditioning the grain including inner and outer drums defining a grain-receiving space between them, the inner of said drums being rotatable, means for rotating said inner drum, means for causing a current of air to traverse the grain receiving space, a relatively large receiver surmounting the outer drum and feeding the grains into the space between the drums, a collector receiving the grain as it falls from the space between the drums and having a relatively small discharge opening, a valve controlling the flow through the discharge opening, and automatic mechanism controlled by the level of the grain in the receiver for regulating the opening and closing of the valve.

10. In a machine of the character described, a frame, a stationary perforated drum mounted on the frame, a receiver surmounting the stationary drum, a shaft extending axially of the receiver and drum, a rotatable perforated drum mounted on the shaft within the stationary drum, a closure for the upper end of the rotatable drum, said drums defining a grain treating space into which the receiver feeds, means for rotating the inner rotating drums, means for causing a current of air to traverse the drums and the grain treating space, a collector receiving the grain as it falls from the grain treating space and having a discharge opening, a valve controlling the flow through the discharge opening, and automatic mechanism controlled by the level of the grain in the receiver for regulating the opening and closing of the valve and comprising a screw splined to the shaft within the receiver and rotating in the grain of the receiver and motion transmission means between the screw and the valve.

DAVID GEDDES.